J. D. ROSS.
ANTISLIPPING DEVICE.
APPLICATION FILED AUG. 31, 1920.
1,364,454.  Patented Jan. 4, 1921.
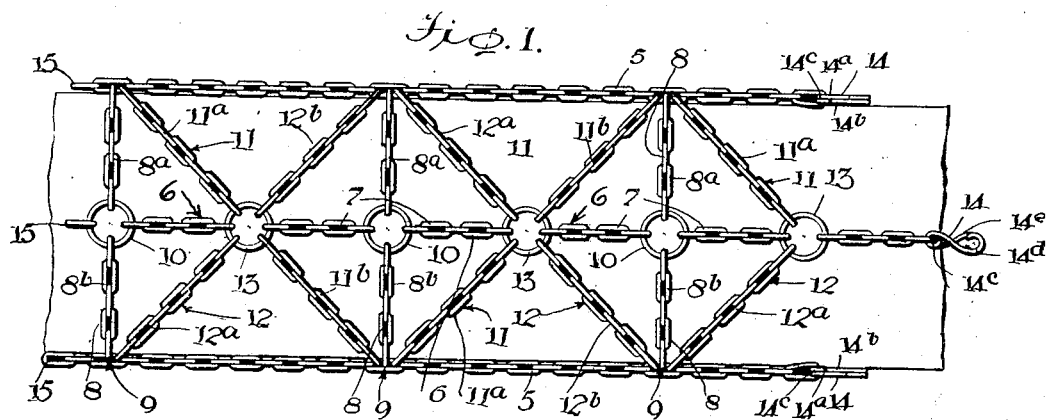
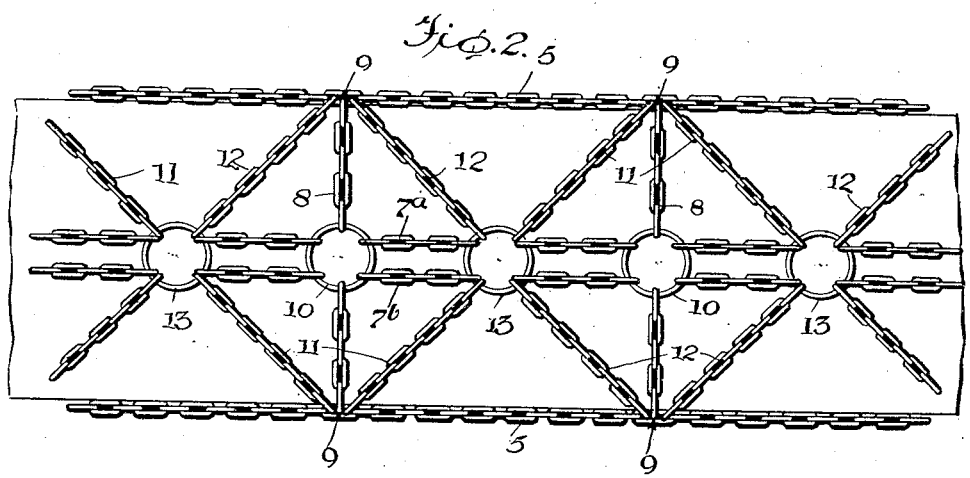
WITNESSES
INVENTOR
J. D. ROSS,
BY
ATTORNEYS

UNITED STATES PATENT OFFICE.

JOHN D. ROSS, OF WASHINGTON, DISTRICT OF COLUMBIA.

ANTISLIPPING DEVICE.

1,364,454.  Specification of Letters Patent.  Patented Jan. 4, 1921.

Application filed August 31, 1920. Serial No. 407,151.

*To all whom it may concern:*

Be it known that I, JOHN D. ROSS, a citizen of the United States, and a resident of the city of Washington, in the District of Columbia, have invented certain new and useful Improvements in Antislipping Devices, of which the following is a specification.

The present invention relates in general to antislipping devices for vehicle wheels or the like, and more particularly to a non-skid chain especially adapted for use with motor vehicles such as automobiles, motor trucks or the like.

The object of the invention is to provide a non-skid chain of this character, which is of extremely simple and durable construction and highly effective in operation to maintain the requisite degree of traction between the wheels of the vehicle and the roadway, which is easy and inexpensive to manufacture, and which is effective at all times to prevent slipping or skidding or other undesirable motion of the wheels themselves or of the vehicle which they carry.

Other objects and advantages of the invention reside in certain novel features of construction, combination and arrangement of parts as will be hereinafter more fully described and particularly pointed out in the appended claims, reference being had to the accompanying drawings forming part of this specification, and in which:

Figure 1 is a fragmentary plan view of one embodiment of my invention applied on the wheel of an automobile;

Fig. 2 is a similar view of a modified form.

Referring to the drawings and especially to Fig. 1 it will be seen that this embodiment of the invention contemplates a plurality of chains adapted to extend circumferentially of the tire. These circumferentially extending chains include parallel side chains 5 which are adapted to be disposed on the opposite sides of the automobile tire or the like and a tread chain 6 arranged intermediate said side chains and parallel thereto and adapted to extend circumferentially of the tread surface of the tire. The tread chain 6 consists of a plurality of short sections designated at 7.

A plurality of cross chains 8 are provided and extend transversely between the side chains 5, thus being adapted to extend across the periphery of the automobile tire or the like. Each of the cross chains 8 consists of a plurality of short sections, preferably two, which are designated at $8^a$ and $8^b$, respectively. One end of each of the sections of the cross chains is connected, as at 9, to the side chains 5, preferably by interengaging the end link of the section of the cross chain with a link of the side chain. As shown in the drawings the cross chains are preferably arranged at regular intervals throughout the extent of the side chains so as to be adapted to be disposed transversely across the periphery of the tire at regular intervals throughout the circumferential extent.

The free ends of the sections of the cross chains, that is the ends of the sections of the cross chains that are not connected to the side chains, are connected to ends of the sections of the tread chain. This connection of the ends of the sections of the cross chain to the sections of the tread chain is preferably accomplished by means of rings 10 which are interengaged with the end links of the sections of both the cross chains and the tread chain and which are adapted to lie flat against the periphery of the tire.

A plurality of angle chains, designated at 11 and 12, respectively, are arranged between the cross chains and extend obliquely between the side chains and at right angles to each other, and are thus adapted to extend parallel across the periphery of the tire throughout its circumferential extent. Each of the angle chains consists of a plurality of short sections designated at $11^a$ and $11^b$, and $12^a$ and $12^b$, respectively. Preferably these sections are of such length that two of them are sufficient to give the extent necessary to connect the angle chains with the side chains. One end of each of the sections of the angle chains are connected to the side chains at the point of connection of the sections of the cross chains thereto and thus the angle chains extend diagonally or obliquely between the side chains. The free ends of the sections of the angle chains, that is the ends that are not connected to the side chains, terminate adjacent the free ends of the sections of the tread chain that is the ends of the sections thereof that are not connected to the cross chains. The adjacent free ends of the angle chains and the tread chain are connected to each other, preferably by means of rings 13 which are interengaged with the end links of these chains and which are adapted to lie flush against the periphery of the tire.

The embodiment of the invention shown in Fig. 2 is more especially adapted for use with heavy motor vehicles such as motor trucks or the like. It is identical in construction with the embodiment of the invention shown in Fig. 1, except that in lieu of the single tread chain 7 a plurality of such tread chains are provided, as designated at 7ª and 7ᵇ. The side chains, the cross chains, the angle chains and the rings connecting these chains and the tread chains are otherwise identical in construction, arrangement and function. It is to be noted that in both embodiments of the invention there are two angle chains which together constitute a pair. The embodiment of the invention shown in Fig. 1 it is to be understood is preferably used with light automobiles.

In both the embodiments of the invention the chain in general is of elongated rectangular form, and is adapted to extend over the entire periphery of the automobile tire or the like. Means are provided for connecting the adjacent meeting ends of the chain when on the wheel of the vehicle. Any suitable means may be employed for this purpose but preferably this means consists of a plurality of hooks 14 connected to the side chains and the tread chains and adapted to engage with links 15 provided on the opposite ends of the chains. The hooks 14 consist of two members 14ª and 14ᵇ which are pivoted together, as at 14ᶜ and which have backwardly curved portions designated at 14ᵈ and 14ᵉ which are adapted to overlie one another. As these curved portions 14ª and 14ᵇ are of corresponding curvature, when they are disposed in overlying or superposed relation they coincide and thus when a link is received in the bights of these curved portions it serves to lock the hook and thus lock the chain on the tire.

In operation when the chain has been placed upon the tire or the like of a vehicle, and power is imparted to the vehicle wheel to turn the same, the tread chain or chains, as the case may be, being disposed between the point of contact of the wheel with the ground and the ground take the major strains and stresses incident to traction. These forces act upon the tread chain or chains to hold them in proper position on the periphery of the tire and in the field of most efficient action and the tread chain or chains in turn maintain the angle chains and the cross chains at all times in position to be effective to exert an anti-slipping function and prevent them being thrown or otherwise moved out of the area in which traction occurs. The side chains 5 are relieved of the strains and stresses incident to traction and serve their intended function, that is, the maintenance of the tire chains on the wheel or tire.

I claim:

1. A tire chain comprising a pair of parallel side chains adapted to be arranged upon the opposite sides of the tire, a tread chain arranged intermediate said side chains and parallel thereto and consisting of a plurality of short sections, a plurality of cross chains extending transversely between said side chains, each of said cross chains comprising two sections, one end of each of said sections being secured to said side chains, a pair of angle chains extending obliquely between said side chains and at right angles to each other, and each consisting of two sections, one end of each of said sections being secured to said side chains at the connection of the cross chains thereto, a plurality of rings connecting the sections of said tread chain and the free ends of the sections of said angle chains, and a plurality of rings connecting the sections of said tread chain and the sections of said cross chains, all as and for the purposes set forth.

2. A tire chain comprising a pair of side chains adapted to be disposed upon the opposite sides of the tire, a tread chain arranged intermediate said side chains and adapted to extend circumferentially of the tread surface of the tire, said tread chain consisting of a plurality of sections, a plurality of cross chains extending transversely between said side chain and consisting of a plurality of sections, one end of each of said sections being connected to said side chains and the other ends of said sections being connected with said tread chain and angle chains arranged between said cross chains and extending obliquely between said side chains, said angle chains being connected with said side chains and said tread chain.

3. A tire chain comprising a pair of side chains, a tread chain arranged intermediate said side chains and adapted to extend circumferentially of the tire, a plurality of cross chains extending transversely between said side chains and directly connected at their ends to said side chains, and a plurality of angle chains arranged between said cross chains and extending obliquely between said side chains and directly connected thereto.

JOHN D. ROSS.